United States Patent [19]
Nagy

[11] Patent Number: 6,115,721
[45] Date of Patent: Sep. 5, 2000

[54] SYSTEM AND METHOD FOR DATABASE SAVE AND RESTORE USING SELF-POINTERS

[75] Inventor: Michael E. Nagy, Tampa, Fla.

[73] Assignee: International Business Machines Corporation, Armonk, N.Y.

[21] Appl. No.: 09/103,080

[22] Filed: Jun. 23, 1998

[51] Int. Cl.[7] .................................................. G06F 17/00
[52] U.S. Cl. ........................... 707/202; 707/101; 707/201
[58] Field of Search ..................................... 707/202, 201, 707/101, 100, 102, 103, 1, 3, 4, 5

[56] References Cited

U.S. PATENT DOCUMENTS

| | | | |
|---|---|---|---|
| 5,502,836 | 3/1996 | Hale et al. .......................... | 395/497.01 |
| 5,551,020 | 8/1996 | Flax et al. ................................ | 395/600 |
| 5,600,840 | 2/1997 | Pearce et al. ........................... | 395/750 |
| 5,995,975 | 11/1999 | Malcom ................................... | 707/101 |
| 6,026,410 | 2/2000 | Allen et al. .............................. | 707/104 |
| 6,041,053 | 3/2000 | Douceur et al. ......................... | 707/100 |

OTHER PUBLICATIONS

Sue et al., One–step pointer forwarding strategy for location tracking in distributed HLR environment, IEEE Journal on Communications, pp. 1455–1466, Oct. 1997.

Jiang, A method of dynamic modeling: a scheme of MBS implementation, Technology Management, p. 395, Oct. 1991.

Moss, Working with persistent objects: to swizzle or not to swizzle, IEEE Software Engineering, pp. 657–673, Aug. 1992.

*Primary Examiner*—Thomas G. Black
*Assistant Examiner*—David Jung
*Attorney, Agent, or Firm*—Shelley M Beckstrand

[57] ABSTRACT

A system and method for saving and restoring RAM-resident databases. Each structure within a database image written to storage includes a self-relative pointer to its actual location in RAM upon being written to disk and may include one or more memory-to-memory pointers to other structures within the database. Upon the database disk image being reloaded to RAM from storage, the self-relative pointers are used to reconstruct the memory-to-memory pointers.

8 Claims, 2 Drawing Sheets

SYSTEM AND METHOD FOR DATABASE SAVE AND RESTORE USING SELF-POINTERS

BACKGROUND OF THE INVENTION

1. Technical Field of the Invention

This invention relates to RAM resident databases. More particularly, it relates to the use of self-relative pointers to reconstruct memory-to-memory pointers between database structures in RAM resident databases when reloaded to RAM from a disk image, such as on a server restart.

2. Background Art

Database servers have to deal with many updates to the database, and yet need to be able to keep an up-to-date image of the database on disk storage to allow for failure recovery and normal server shutdown and restart. Such servers need to be able to keep the image on disk storage up-to-date quickly to remain responsive to queries. However, complex and generally slow disk-based architectures have evolved in the art which use commit-fallback schemes to assure integrity of the database image on disk. Consequently, there is a need in the art for a system and method which provides a RAM-resident database allowing quick responses to queries and updates, but which still allows a very rapid commit-to-disk of the entire database image in a single flash operation.

It is known in the art to provide a system of pointers for control of saving RAM to disk and performing the reverse operation of disk to RAM.

One such system is described in U.S. Pat No. 5,600,840, which uses b-tree style database pointer blocks to define a hierarchy of data blocks. However, in this approach, data blocks must be reloaded into memory at the same memory locations they occupied prior to being saved to disk.

Another system is described in U.S. Pat. No. 5,551,020, which also uses pointers to organize the database files on disk, but focuses on ways of organizing and compressing the database files to minimize their physical size on the storage media.

It is an object of the invention to provide an improved RAM resident database structure.

It is a further object of the invention to provide a RAM resident database structure which enables rapid commit-to-disk of the entire database in a single flash operation.

It is a further object of the invention to provide a RAM resident database structure which enables fast reconstruction of memory-to-memory pointers between structures within the RAM resident database upon an image of the database being reloaded to RAM from storage.

It is a further object of the invention to provide an improved method for maintaining the integrity of an on-disk image of a RAM resident database.

It is a further object of the invention to provide an improved method for updating memory-to-memory pointers in a RAM resident database upon being reconstructed from the on-disk image.

SUMMARY OF THE INVENTION

This invention comprises a system and method for saving and restoring RAM-resident databases. Each structure within a database image written to storage includes a self-relative pointer to its actual location in RAM upon being written to disk and may include one or more memory-to-memory pointers to other structures within the database. Upon the database disk image being reloaded to RAM from storage, the self-relative pointers are used to reconstruct the memory-to-memory pointers.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, a RAM-resident database is maintained, allowing quick response to queries and updates, but structured to allow a very rapid commit-to-disk of the entire database in a single flash operation. Self-relative pointers are used to reconstruct the memory-to-memory pointers in the RAM-resident database as needed when the disk image is reloaded into RAM, such as on a server restart. This approach is applicable to many classes of database server applications, one example being a Web server.

Figure 1:
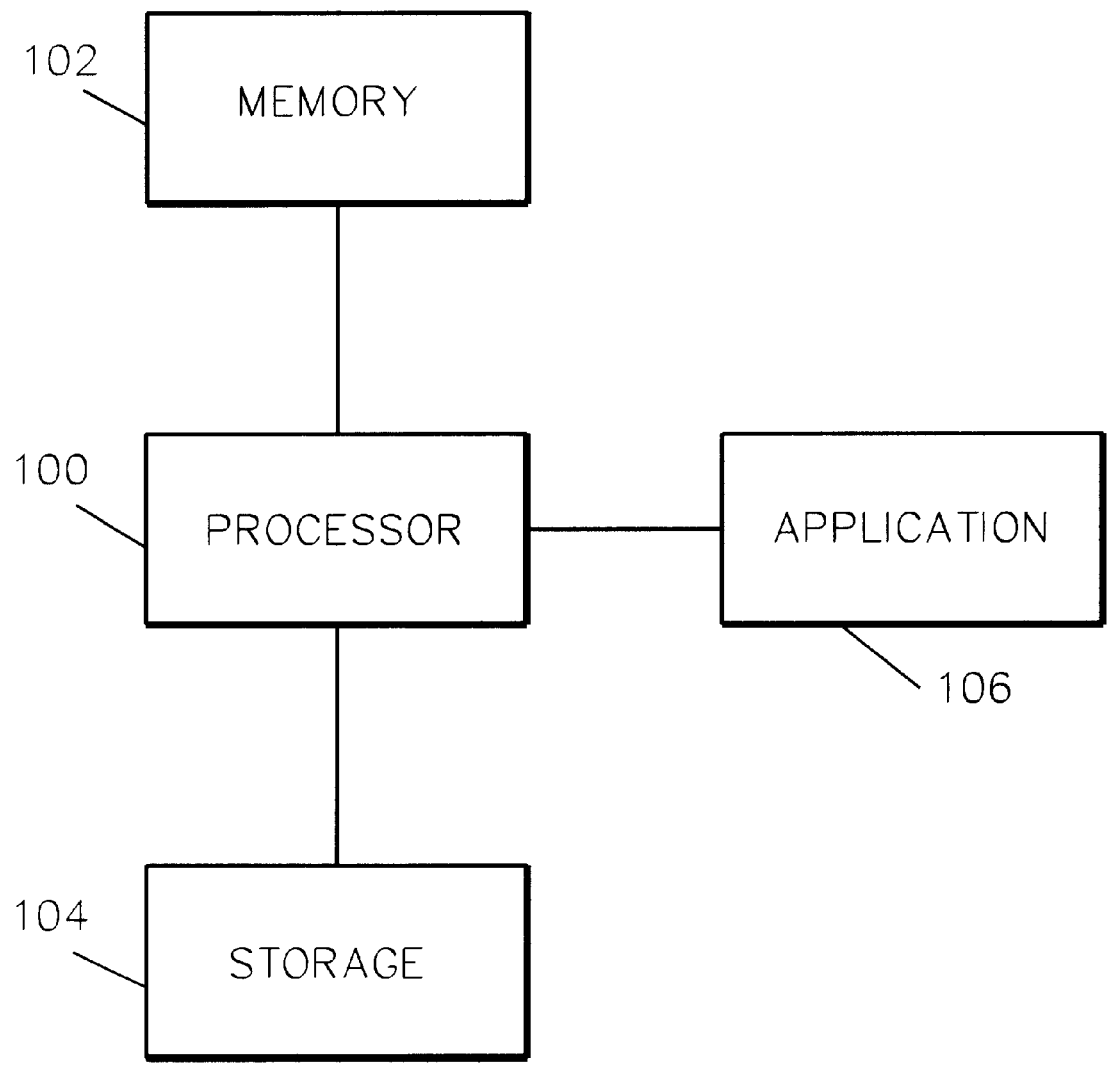
FIG. 1 is an illustration of a system as contemplated in the preferred embodiment.

Referring to FIG. 1, a typical server may include a processor 100, a memory 102, such as a volatile, high speed random access memory (RAM), and storage 104, such as a high capacity magnetic disk, or other such non-volatile storage device.

In accordance with the invention, a database image is maintained in RAM and selectively written to or recovered from storage 104.

Figure 2:
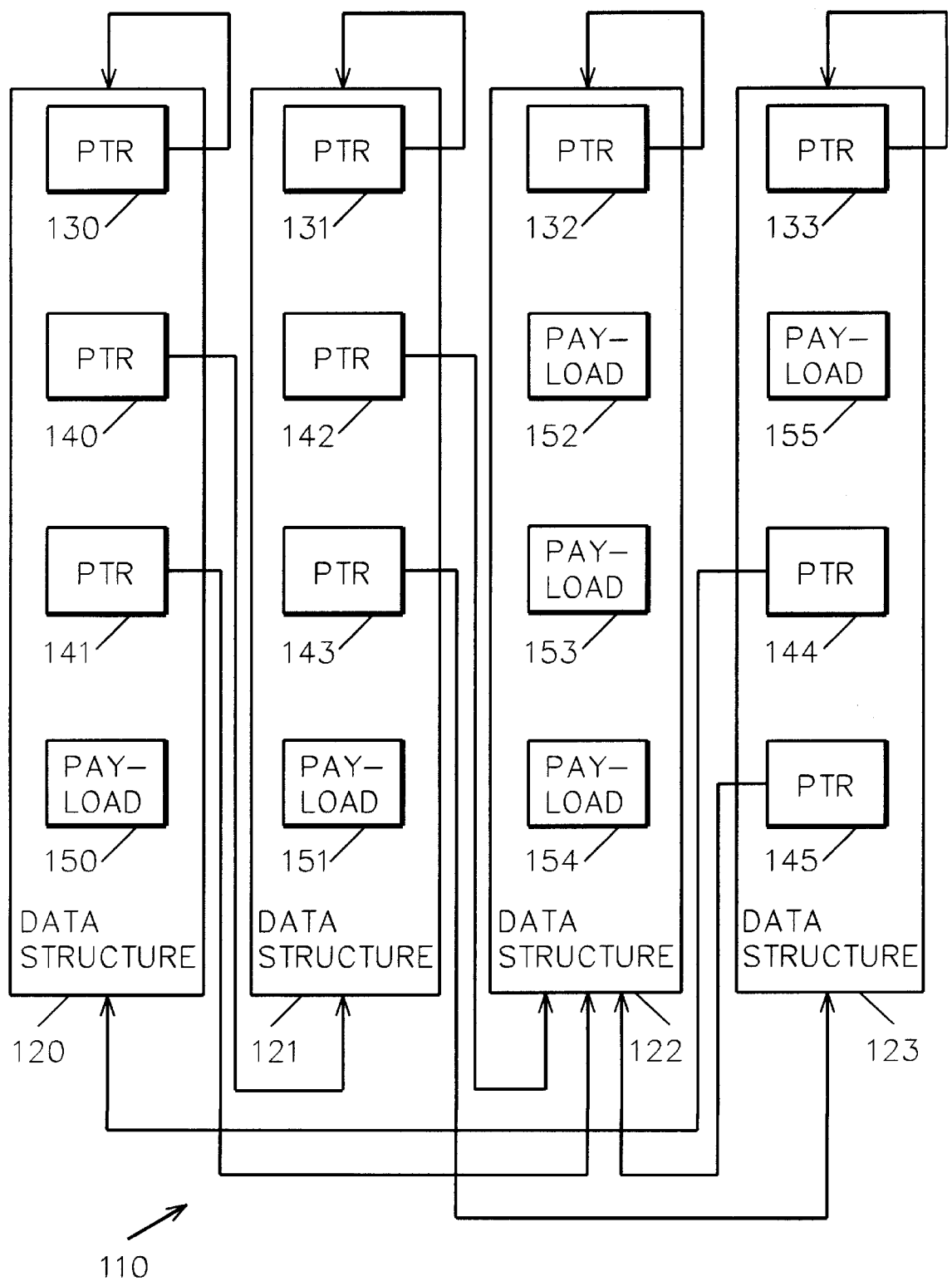
FIG. 2 is an illustration of a representative database structure in accordance with the preferred embodiment.

Referring to FIG. 2, a representative database image 110 in accordance with the invention includes a plurality of database structures 120–123. Each structure 120–123 contains several elements, some of which are pointers 140 . . . to other structures in memory. These pointers are memory 102 addresses which are only valid for the specific application program 106 which is running in processor 100 at the moment. Each structure 120–123 can also, optionally, carry payload data 150 . . . which does not consist of memory addresses. Each structure 120–123 starts with a self pointer 130–133, respectively. Each such pointer 120–123 is initialized to the actual address in memory 102 of its respective data structure 130–133 when structures 130–133 are written to storage 104. Alternatively, such pointers 120–123 may be maintained current so as to require no updating at the time of flash storage of the database 110 image to storage 104. Thus, data structure 120 includes self pointer 130, pointer 140 to structure 121, pointer 141 to structure 122, and payload data 150. Data structure 121 includes self pointer 131, pointer 142 to data structure 122, pointer 143 to data structure 123, and payload data 151. Data structure 122 includes self pointer 132, and data payload data 152–154. Data structure 123 includes self pointer 133, payload 155, pointer 144 to data structure 120, and pointer 145 to data structure 122.

In operation, when database 110, including the set of data structures 120–123 is to be stored from RAM 102 to disk 104, each structure 120–123 is written to disk with no regard to the inter-structure relationships. The disk image of database 110 will contain the self-relative memory address pointers 130–133 of each structure 120–123, respectively.

When processor 100 application 106 wishes to reload database image 110 from storage 104 to RAM 102, it loads each structure 120–123 into memory 102, preserving the old self pointer values from pointers 130–133. After all structures 120–123 are loaded into memory 102, application 106 correlates the inter-structure pointers 140, 141 . . . with self pointer values 130–133 to recognize and recreate the original inter-structure relationships which existed in the original application instance before the database image 110 was written to disk 104.

For example, structure 123 contains pointer 144 to structure 120. This pointer 144 is reestablished by matching the value in pointer 144 to the self pointer 130 in data structure 120. When this match is found, the current in-memory pointer to data structure 120 is written over the old value 144 in data structure 123. This process is repeated for each memory-to-memory pointer 140, 141, 142, 143, 144 and 145. When completed, the original relationships for application 106 between structures 120–123 in memory 102 have been completely reconstituted.

Referring to Table 1, there is presented a pseudo code representation of the method of the preferred embodiment of the invention for flash writing an image of database 110 from RAM memory 102 to disk storage 104.

Referring to Table 2, there is presented a pseudo code representation of the method of the preferred embodiment of the invention for restoring an image of database 110 from storage 104 to memory 102.

TABLE 1

Flash Write Memory to Storage

```
For Memory Database backup operation
    For each Structure in Database,
        Set SelfPointer equal to ActualMemoryLocation of this
        Structure;
    End;
    Flash write Database to Storage;
End;
```

TABLE 2

Restore Database to Memory from Storage

```
For Memory Database restore operation
    For each Structure in Database loaded from Storage into
    Memory,
        OldMemoryLocation equals SelfPointer for this Structure;
        NewActualMemoryLocation equals actual memory location
        into which this Structure is loaded;
    End;
    For each ThisStructure in Database,
        For each ThisPointer in this ThisStructure,
            Find OtherStructure with OldMemoryLocation equal to
            ThisPointer;
                Set ThisPointer equal to NewActualMemoryLocation
                for OtherStructure;
            End;
        End;
    End;
End;
```

Advantages over the Prior Art

The advantages of the method of the preferred embodiment of this invention include the provision of: an improved RAM resident database structure; a RAM resident database structure which enables rapid commit-to-disk of the entire database in a single flash; a RAM resident database structure which enables fast reconstruction of memory-to-memory pointers between structures within the RAM resident database upon an image of the database being reloaded to RAM from storage; an improved method for maintaining the integrity of an on-disk image of a RAM resident database; and an improved method for updating memory-to-memory pointers in a RAM resident database upon being reconstructed from the on-disk image.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Also, storage 104 has been generally represented as non-volatile, magnetic storage. However, any storage device, such as magnetic tape, optical storage, or even volatile storage devices may be used for storing the backup image of the database. Similarly, there is no requirement that RAM memory 102 be volatile (in the sense that data is lost upon removal of power).

Accordingly, the scope of protection of this invention is limited only by the following claims and their equivalents.

I claim:

1. A database structure for enabling a database image to be written from memory to, and recovered from, a storage device, comprising:

a plurality of data structures, each said data structure including a self-pointer and zero or more memory pointers to other data structures within said database structure;

each said self-pointer including indicia representative of the location in memory occupied by said data structure prior to be written to said storage device;

each said memory pointer including indicia representative of the location in memory occupied by another of said data structures prior to be written to said storage device.

2. A database system, comprising:

a main memory;

a storage device;

a processor;

a plurality of database structures collectively comprising a database image, each said data structure including a self-pointer and zero more memory pointers to other data structures within said database structure;

each said self-pointer including indicia representative of the location in said main memory occupied by said data structure prior to being written to said storage device;

each said memory pointer including indicia representative of the location in said memory occupied by another of said data structures prior to being written to said storage device.

3. Method for storing a memory database image to a storage device to enable said database image to be recovered from said storage device to a main memory, comprising the steps of:

initializing a self pointer in each data structure within said database image to point to the location in main memory occupied by said each data structure;

initializing at least one memory pointer in a first data structure to point to the location in main memory occupied by a second data structure; and storing said database image to said storage device.

4. The method of claim 3, comprising the further steps of:

loading said database image from said storage device to said main memory including the self pointer of each said data structure; and resolving said one memory pointer to point to the location in main memory now occupied by said second data structure.

5. The method of claim 4, wherein said resolving step includes the further steps of:

identifying the self pointer loaded to main memory corresponding to said one memory pointer;

setting said one memory pointer to point to the location in main memory now occupied by the data structure corresponding to said self pointer.

6. A program storage device readable by a machine, tangibly embodying a program of instructions executable by a machine to perform method steps for storing a memory database image to a storage device to enable said database image to be recovered from said storage device to a main memory, said method steps comprising:

initializing a self pointer in each data structure within said database image to point to the location in main memory occupied by said each data structure;

initializing at least one memory pointer in a first data structure to point to the location in main memory occupied by a second data structure; and storing said database image to said storage device.

7. The program storage device of claim 6 where in said method steps further comprise:

loading said database image from said storage device to said main memory including the s elf pointer of each said data structure; and resolving said one memory pointer to point to the location in main memory now occupied by said second data structure by identifying the self pointer loaded to main memory corresponding to said one memory pointer and setting said one memory pointer to point to the location in main memory now occupied by the data structure corresponding to said self pointer.

8. An article of manufacture comprising a computer useable medium having computer readable program code means embodied therein for storing a memory database image to a storage device to enable said database image to be recovered from said storage device to a main memory, the computer readable program means in said article of manufacture comprising:

computer readable program code means for causing a computer to effect initializing a self pointer in each data structure within said database image to point to the location in main memory occupied by said each data structure;

computer readable program code means for causing a computer to effect initializing at least one memory pointer in a first data structure to point to the location in main memory occupied by a second data structure; and computer readable program code means for causing a computer to effect storing said database image to said storage device.

* * * * *